J. MULLALY.
Machines for Melting Snow.
No. 136,932.                      Patented March 18, 1873.
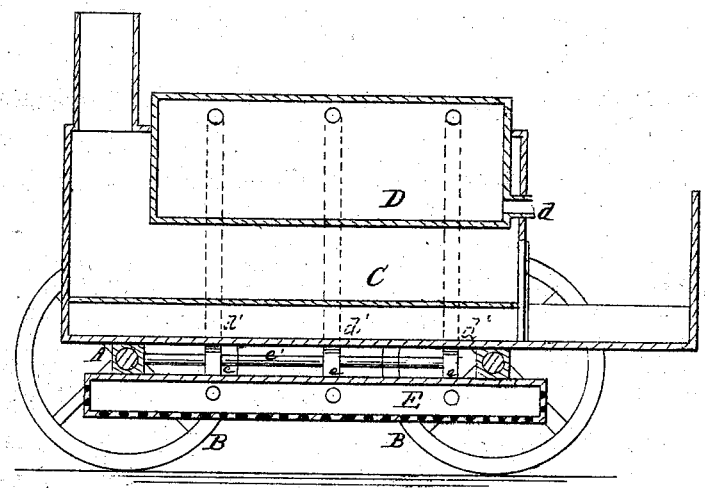
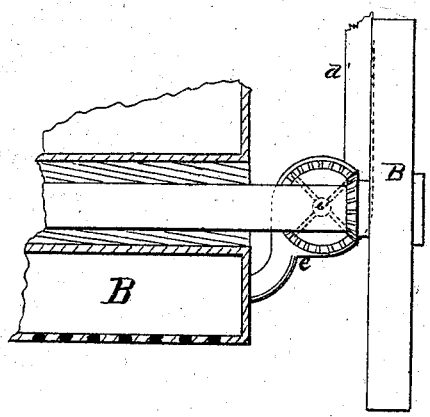
Witnesses.
J. B. Connolly
E. Connolly.
Inventor.
John Mullaly
Connolly Bros
Attys.

UNITED STATES PATENT OFFICE.

JOHN MULLALY, OF NEW YORK, N. Y.

IMPROVEMENT IN MACHINES FOR MELTING SNOW.

Specification forming part of Letters Patent No. 136,932, dated March 18, 1873.

*To all whom it may concern:*

Be it known that I, JOHN MULLALY, of New York, in the county of New York and State of New York, have invented certain new and useful Improvements in Machines for Melting Snow; and I do hereby declare the following to be a full, clear, and exact description of the invention, such as will enable others skilled in the art to which it pertains to make and use it, reference being had to the accompanying drawing which forms part of this specification.

Referring to the drawing, Figure 1 is a vertical longitudinal section of my invention. Figs. 2, 3, 4, and 5 are details.

My invention has for its object to furnish means for melting snow in the streets of cities and towns; and it consists, generally, of a machine that, in its passage over the ground discharges a volume of hot air, which, coming in contact with the snow, reduces it to water.

Referring to the drawing, A shows the frame of a machine, constructed according to my invention, mounted on wheels B B, which may, if desired, be flanged to adapt them to tracks of railroads. C is the furnace, above which is the heating-chamber D, to which air is supplied by means of a pipe or pipes, $d$. The air heated in the chamber is conveyed through the pipes $d'$ $d'$ to a distributing-tank, E, located beneath the frame.

The air is drawn from the chamber D and expelled from the tank E by means of blowers or fans $e$ $e$, said tank having a perforated bottom, as shown, through which the air is discharged upon the heaps of snow. The fans are mounted on a shaft, $e'$, having a gear or equivalent connection with the traction-wheels B B; or any other suitable means may be employed for conveying rotary motion to said shaft.

The distributing-tank may be perforated, so as to allow the air to be discharged upon piles of snow in front, or at the sides or rear of the machine; and instead of the simple orifices shown in the drawing, open projections may be employed.

Claims.

1. In a snow-melting machine, the combination of the air-heating apparatus, conducting-tubes, and blast-fans with the perforated tank or distributer located underneath the apparatus and between the wheels, substantially as and for the purpose described.

2. The devices described for imparting motion to the blast-fans, in combination with the air-heater, conduction-pipes, and tank or distributer, all substantially as and for the purpose specified.

In testimony that I claim the foregoing I have hereunto set my hand this 5th day of February, 1873.

JOHN MULLALY.

Witnesses:
GEO. C. SHELMERDINE,
M. DANL. CONNOLLY.